US009649745B2

(12) United States Patent
Demirtas et al.

(10) Patent No.: US 9,649,745 B2
(45) Date of Patent: May 16, 2017

(54) APPARATUS FOR PRODUCING $CO_2$ PELLETS FROM $CO_2$ SNOW AND CLEANING DEVICE

(71) Applicant: Alfred Kärcher GmbH & Co. KG, Winnenden (DE)

(72) Inventors: Yunus Demirtas, Kornwestheim (DE); Dieter Plachke, Winnenden (DE); Markus Weller, Backnang (DE); Andreas Kruner, Fellbach (DE); Andreas Krauter, Steinheim (DE); Rene Klink, Alfdorf-Buchengehren (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 0 days.

(21) Appl. No.: 15/165,971

(22) Filed: May 26, 2016

(65) Prior Publication Data
US 2016/0271755 A1  Sep. 22, 2016

Related U.S. Application Data

(63) Continuation of application No. PCT/EP2014/075941, filed on Nov. 28, 2014.

(30) Foreign Application Priority Data

Nov. 29, 2013 (DE) .................. 10 2013 113 275

(51) Int. Cl.
*B24C 11/00* (2006.01)
*B24C 1/00* (2006.01)
(Continued)

(52) U.S. Cl.
CPC .............. *B24C 11/00* (2013.01); *B24C 1/003* (2013.01); *B30B 11/201* (2013.01); *B30B 11/24* (2013.01); *C01B 31/22* (2013.01)

(58) Field of Classification Search
CPC ....... B24C 11/00; B24C 1/003; B30B 11/201; B30B 11/24; C01B 31/22
(Continued)

(56) References Cited

U.S. PATENT DOCUMENTS 2,499,386 A * 3/1950 Joerren .................. B30B 11/16
264/115
3,670,516 A * 6/1972 Duron ..................... C01B 31/22
425/154
(Continued)

FOREIGN PATENT DOCUMENTS

DE      21 06 477       8/1971
DE      102 24 778     12/2003
(Continued)

*Primary Examiner* — Robert Rose
(74) *Attorney, Agent, or Firm* — Womble Carlyle Sandridge & Rice LLP

(57) ABSTRACT

The invention relates to an apparatus for producing $CO_2$ pellets from $CO_2$ snow, in particular, for a cleaning device for spraying surfaces to be treated with a mixed stream of a pressurized gas and $CO_2$ pellets, includes a compressor device for compressing $CO_2$ snow to form $CO_2$ pellets. The compressor device includes a gear compressor. The gear compressor includes at least one compressor wheel which is mounted rotatable about a first rotation axis and has a plurality of compressing elements, and includes at least one intake wheel which has a plurality of snow intakes for accepting $CO_2$ snow. The snow intakes are configured corresponding to the compressing elements. The intake wheel is mounted rotatable about a second rotation axis and cooperates with the at least one compressor wheel. The intake wheel includes an intake wheel sleeve with an intake wheel sleeve wall.

39 Claims, 8 Drawing Sheets

Figure 1:
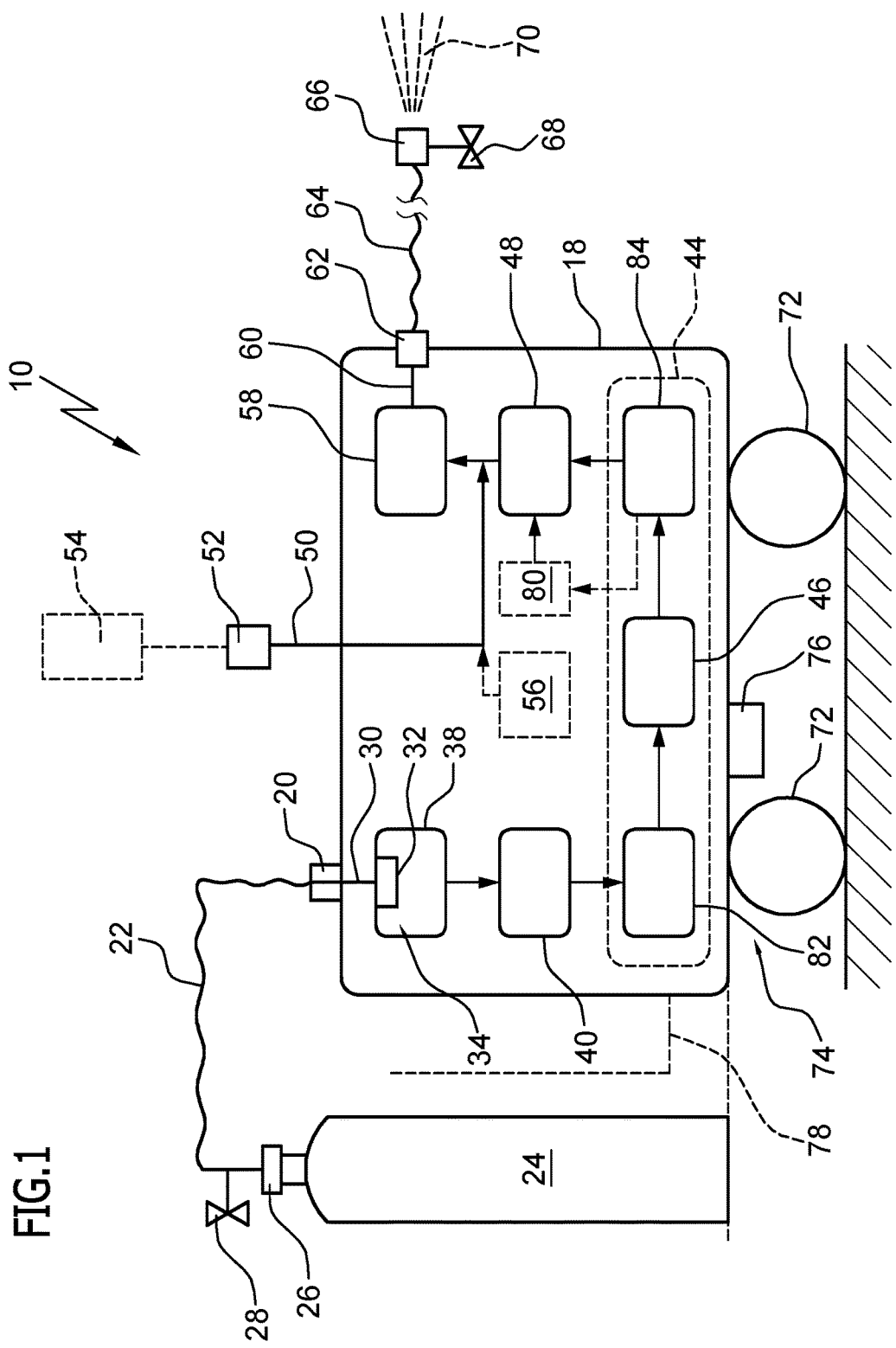

(51) Int. Cl.
*B30B 11/20* (2006.01)
*C01B 31/22* (2006.01)
*B30B 11/24* (2006.01)

(58) Field of Classification Search
USPC .............. 451/99, 75, 87, 88, 53; 134/7
See application file for complete search history.

(56) References Cited

U.S. PATENT DOCUMENTS

| | | | | |
|---|---|---|---|---|
| 3,817,045 A | * | 6/1974 | Muska | C01B 31/22 62/605 |
| 4,389,820 A | * | 6/1983 | Fong | B01F 3/0092 451/39 |
| 4,703,590 A | * | 11/1987 | Westergaard | B24C 1/003 451/39 |
| 4,947,592 A | * | 8/1990 | Lloyd | B24C 1/003 134/7 |
| 5,135,553 A | | 8/1992 | Rebhan | |

FOREIGN PATENT DOCUMENTS

| | | |
|---|---|---|
| DE | 10 2008 036 331 | 11/2009 |
| DE | 10 2008 027 283 | 12/2009 |
| EP | 0 429 698 | 6/1991 |

\* cited by examiner

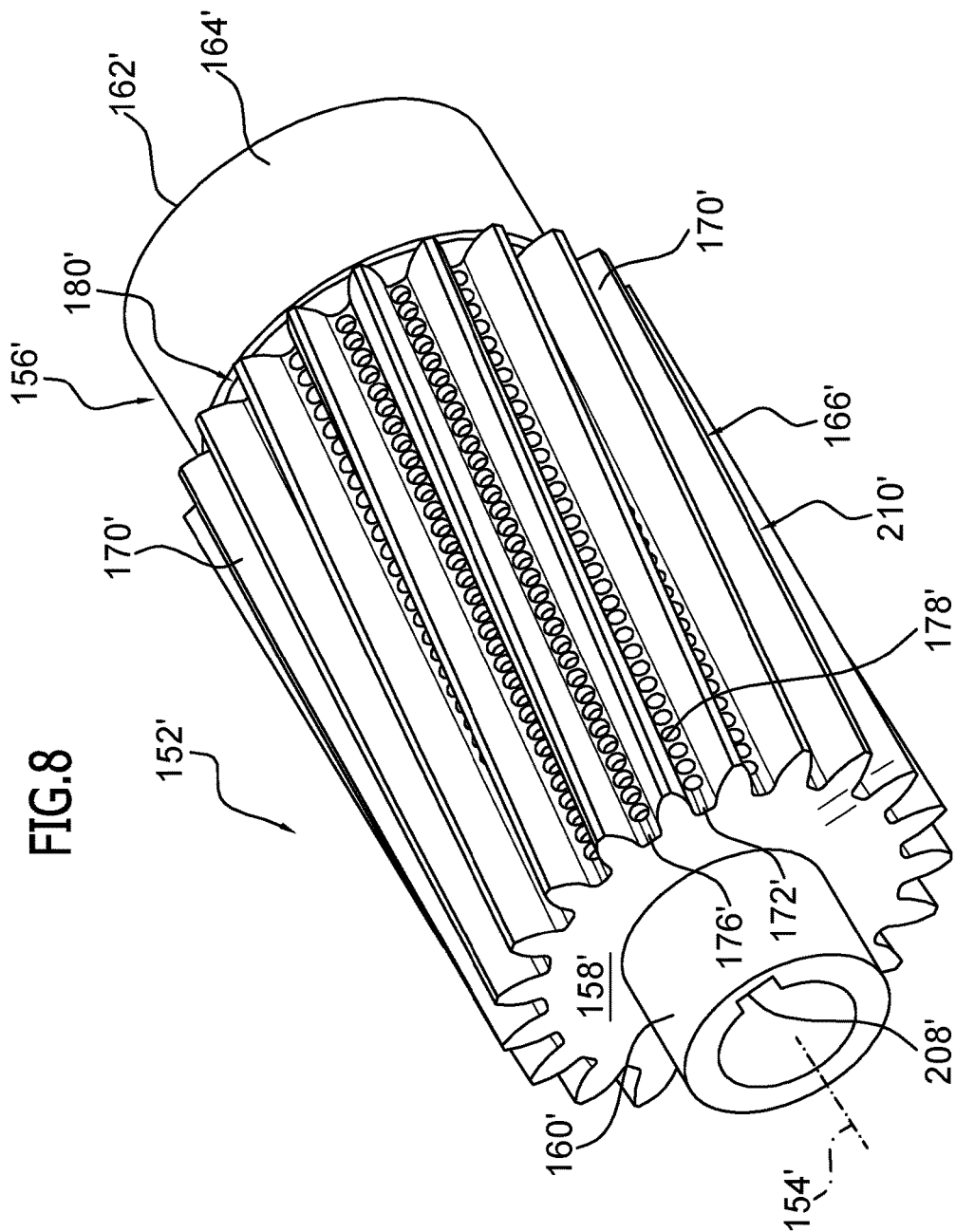

APPARATUS FOR PRODUCING $CO_2$ PELLETS FROM $CO_2$ SNOW AND CLEANING DEVICE

CROSS-REFERENCE TO RELATED APPLICATIONS

This application is a continuation of international application number PCT/EP2014/075941 filed on Nov. 28, 2014 and claims the benefit of German application number 10 2013 113 275.8 filed on Nov. 29, 2013, the entire specification of both being incorporated herein by reference in their entirety and for all purposes.

FIELD OF THE INVENTION

The present invention relates to an apparatus for producing $CO_2$ pellets from $CO_2$ snow generally, and more specifically to an apparatus for producing $CO_2$ pellets from $CO_2$ snow, in particular, for a cleaning device for spraying surfaces to be treated with a mixed stream of a pressurized gas and $CO_2$ pellets, comprising a compressor device for compressing $CO_2$ snow to form $CO_2$ pellets, wherein the compressor device comprises a gear compressor, the gear compressor comprising at least one compressor wheel which is mounted rotatable about a first rotation axis and having a plurality of compressing elements, and comprising at least one intake wheel which has a plurality of snow intakes for accepting $CO_2$ snow and is configured corresponding to the compressing elements, said intake wheel being mounted rotatable about a second rotation axis and cooperating with the at least one compressor wheel.

The invention also relates to cleaning devices generally, and more specifically to a cleaning device for spraying surfaces to be treated with a mixed stream of pressurized gas and $CO_2$ pellets.

BACKGROUND OF THE INVENTION

From DE 10 2008 036 331 B3, there is known a jet device for spraying surfaces to be treated with a mixed stream of pressurized gas and dry ice pellets. This comprises a screw conveyor which presses $CO_2$ snow through a die in order thereby to produce $CO_2$ pellets. Compressor devices in the form of gear compressors are known, for example, from DE 21 06 477 B2 and EP 0429 698 A1.

A disadvantage of the known spraying devices is, in particular, that with the compressor device used, only a very inhomogeneous mixture of differently-sized $CO_2$ pellets can be produced.

SUMMARY OF THE INVENTION

In a first aspect of the invention, an apparatus for producing $CO_2$ pellets from $CO_2$ snow, in particular, for a cleaning device for spraying surfaces to be treated with a mixed stream of a pressurized gas and $CO_2$ pellets, comprises a compressor device for compressing $CO_2$ snow to form $CO_2$ pellets. The compressor device comprises a gear compressor. The gear compressor comprises at least one compressor wheel which is mounted rotatable about a first rotation axis and has a plurality of compressing elements, and comprises at least one intake wheel which has a plurality of snow intakes for accepting $CO_2$ snow. The snow intakes are configured corresponding to the compressing elements. The intake wheel is mounted rotatable about a second rotation axis and cooperates with the at least one compressor wheel. The intake wheel comprises an intake wheel sleeve with an intake wheel sleeve wall. The snow intakes are arranged or formed in the intake wheel sleeve wall. The snow intakes are configured in the form of recesses which are open in the radial direction. An interior space formed by the intake wheel sleeve is configured to receive the $CO_2$ pellets.

In a second aspect of the invention, a cleaning device for spraying surfaces to be treated with a mixed stream of a pressurized gas and $CO_2$ pellets, comprises an apparatus described in accordance with the first aspect of the invention for producing $CO_2$ pellets from $CO_2$ snow.

BRIEF DESCRIPTION OF THE DRAWING FIGURES

Figure 2:
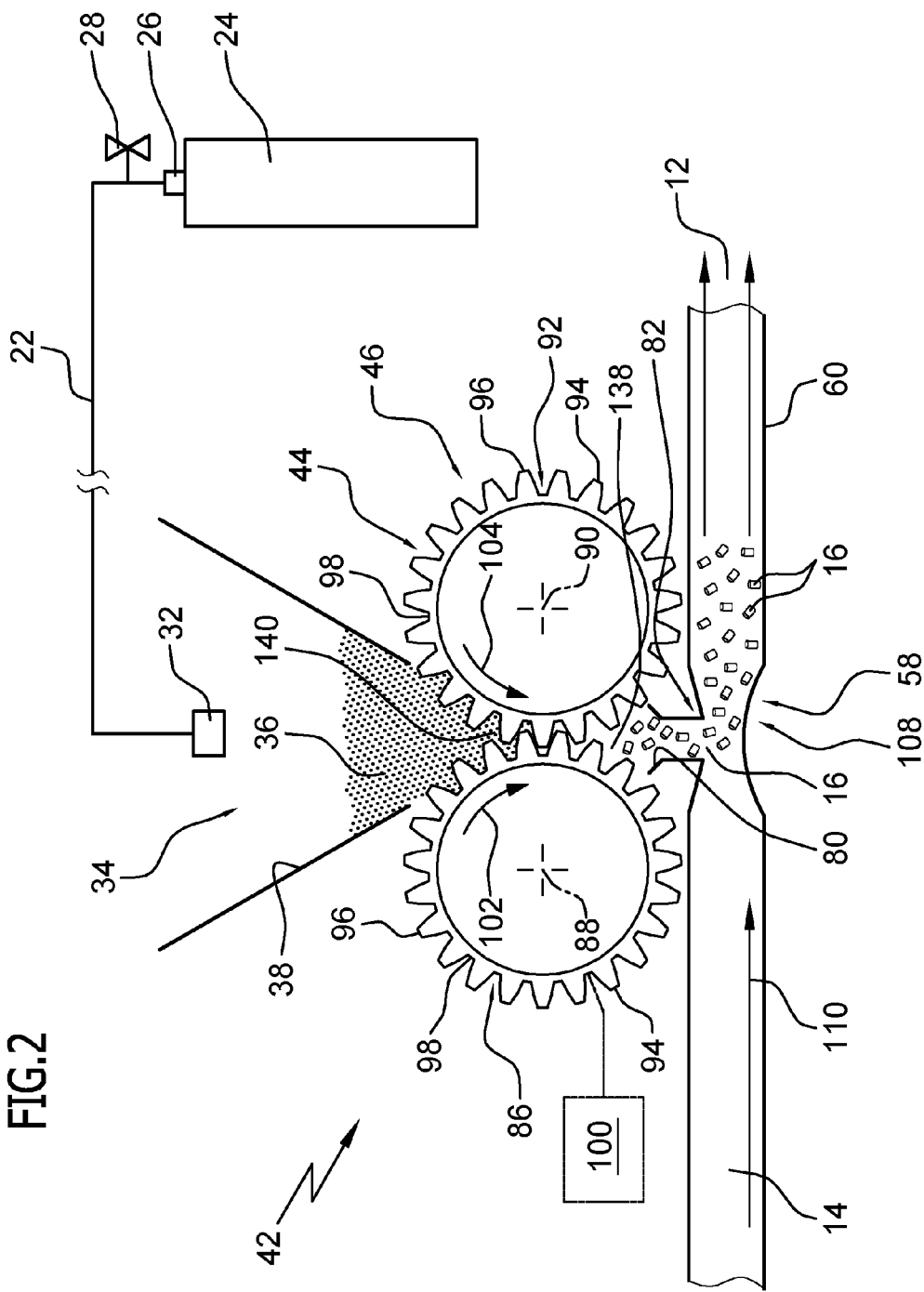
Figure 3:
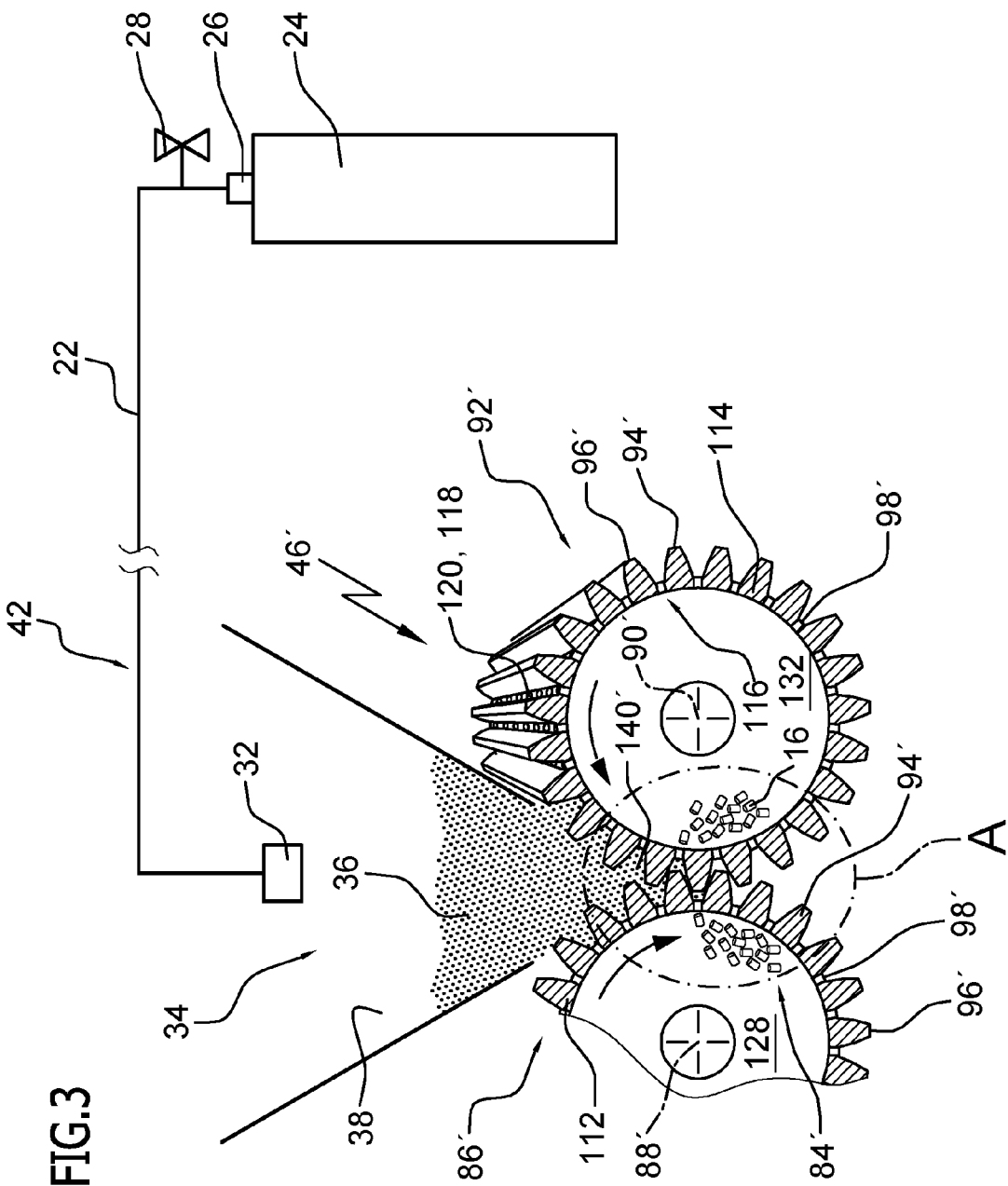
Figure 4:
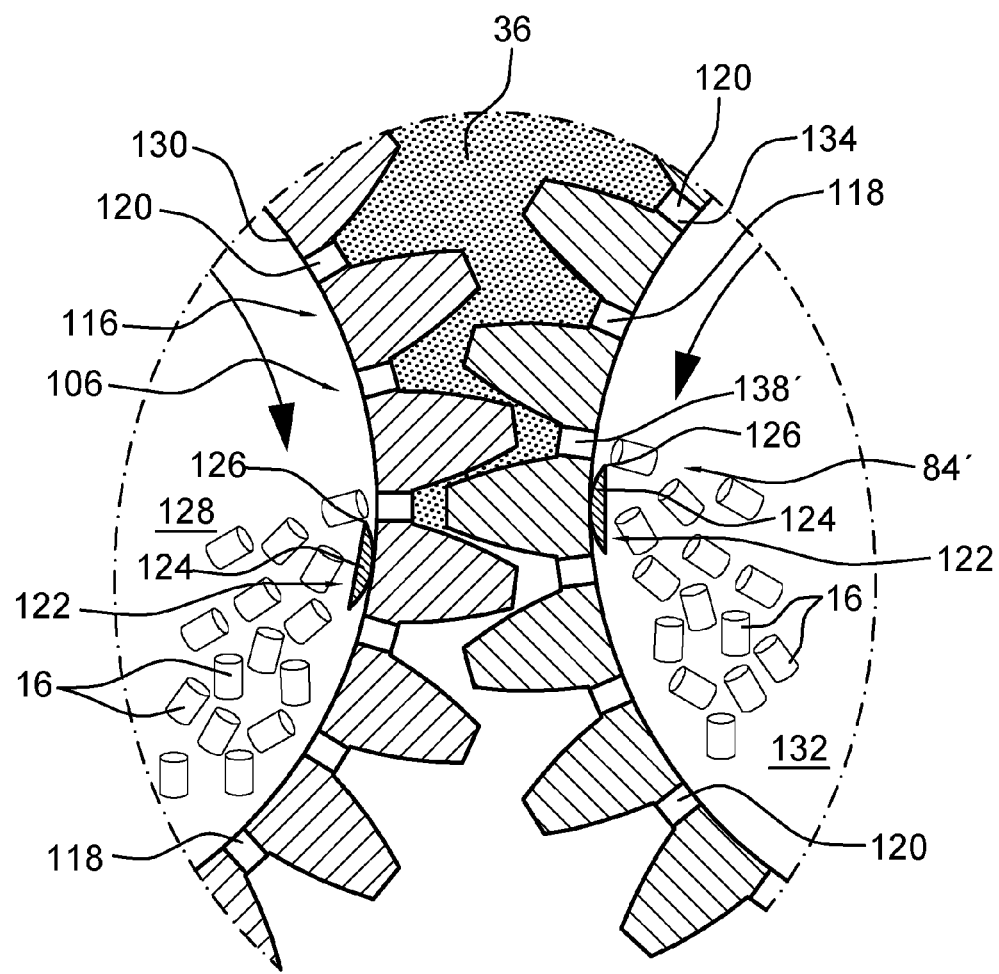
Figure 5:
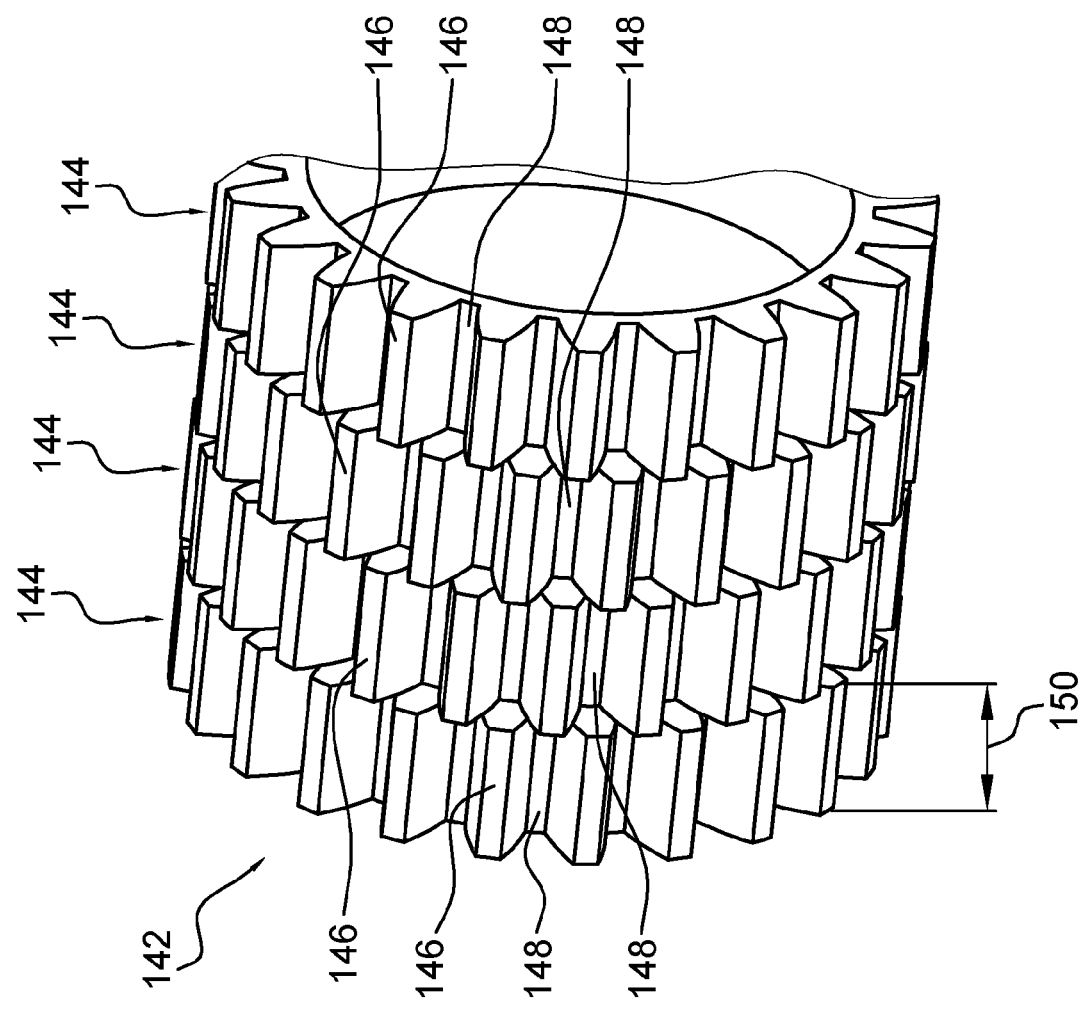
Figure 6:
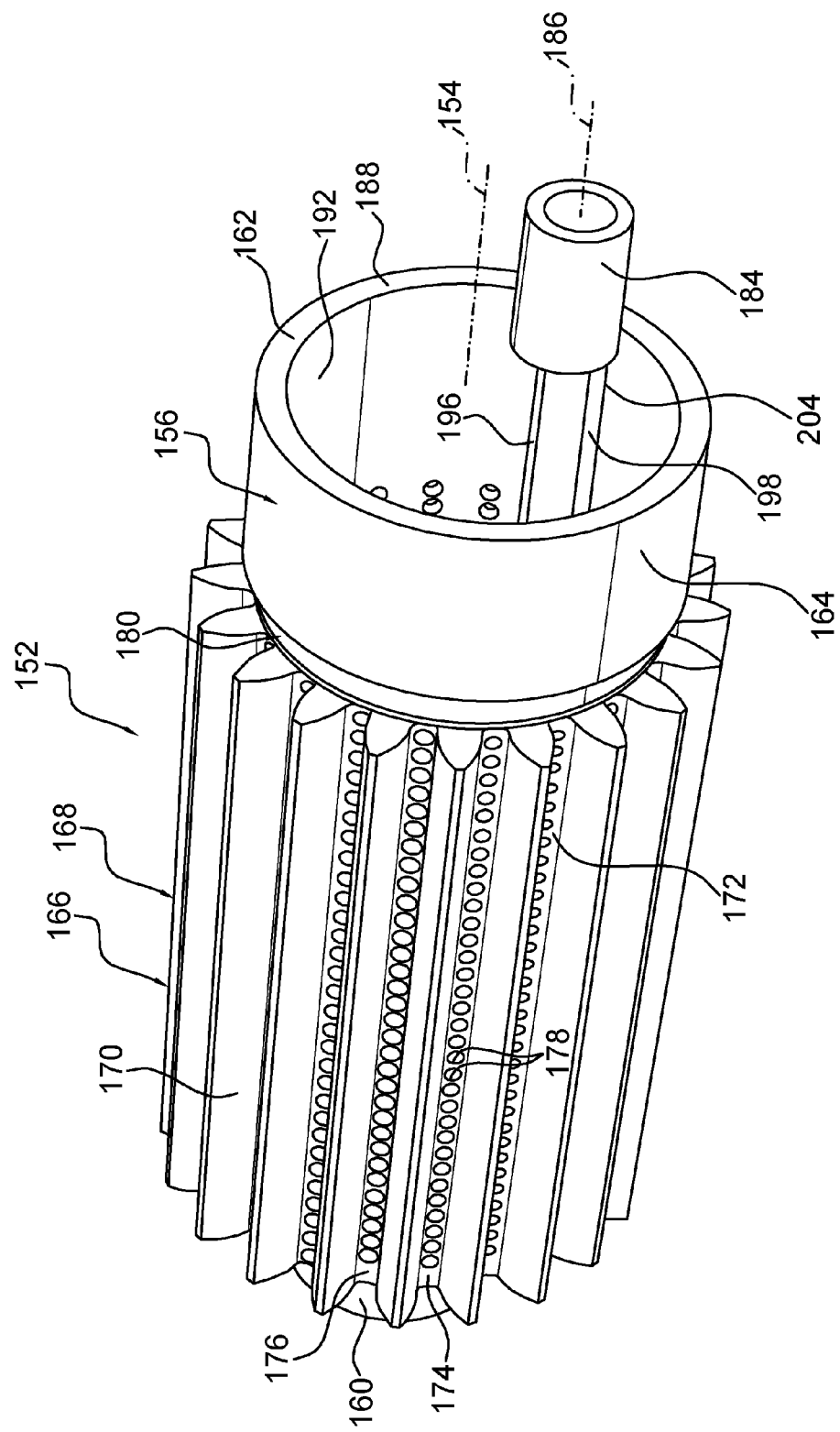
Figure 7:
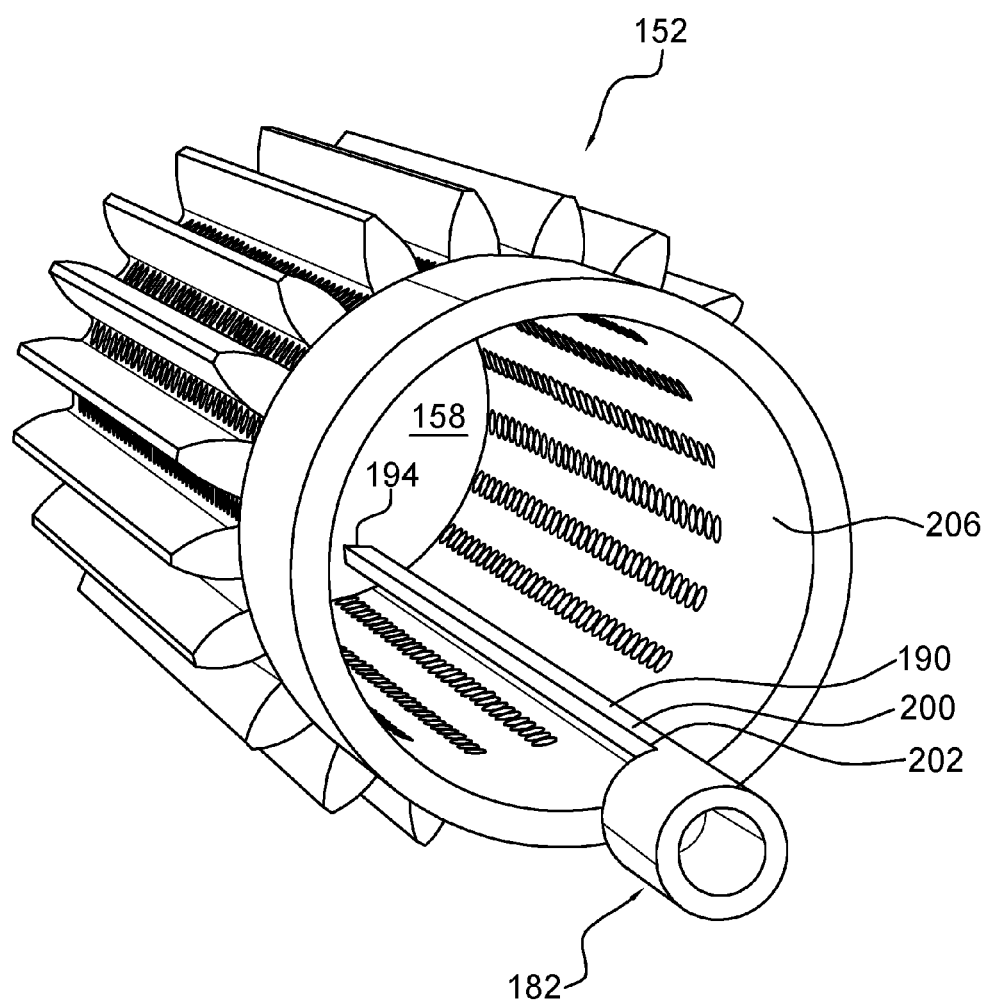

The foregoing summary and the following description may be better understood in conjunction with the drawing figures, which show:

FIG. 1: a schematic representation of a cleaning device for spraying surfaces to be treated with a mixed stream of a pressurized gas and CO2 pellets;

FIG. 2: a schematic representation of a CO2 pellet generating system;

FIG. 3: a schematic representation of a pellet generating device with an alternative compressor device;

FIG. 4: an enlarged view of the region A in FIG. 3;

FIG. 5: a schematic partial view of a compressor wheel arrangement comprising a plurality of gear wheels;

FIG. 6: a perspective view of a spur-toothed gear wheel usable as a compressor wheel and/or an intake wheel, with a scraping device;

FIG. 7: a further perspective view of the gear wheel of FIG. 6; and

FIG. 8: a perspective view of a helical gear wheel usable as a compressor wheel and/or an intake wheel.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to an apparatus for producing $CO_2$ pellets from $CO_2$ snow, in particular, for a cleaning device for spraying surfaces to be treated with a mixed stream of a pressurized gas and $CO_2$ pellets, comprising a compressor device for compressing $CO_2$ snow to form $CO_2$ pellets, wherein the compressor device comprises a gear compressor, wherein the gear compressor comprises at least one compressor wheel which is mounted rotatable about a first rotation axis and has a plurality of compressing elements, and comprising at least one intake wheel which has a plurality of snow intakes for accepting $CO_2$ snow, said snow intakes being configured corresponding to the compressing elements, said intake wheel being mounted rotatable about a second rotation axis and cooperating with the at least one compressor wheel, wherein the intake wheel comprises an intake wheel sleeve with an intake wheel sleeve wall, wherein the snow intakes are arranged or formed in the intake wheel sleeve wall, wherein the snow intakes are configured in the form of recesses which are open in the radial direction and wherein an interior space formed by the intake wheel sleeve is configured to receive the $CO_2$ pellets.

As distinct from a compressor device comprising a screw conveyor and a die, a gear compressor enables, in particular, independently of the configuration of the components used for compression, in particular, cooperating gears, the production of $CO_2$ pellets which are substantially all equally sized. A very homogeneous distribution of $CO_2$ pellets has the advantage, in particular, in relation to their use in a cleaning device, that the $CO_2$ pellets accelerated by a pressurized gas stream also all have substantially the same energy so that a relatively homogeneous energy distribution is achieved in the mixed stream. Therefore in a $CO_2$ pellet mixture with a more homogeneous size distribution of the $CO_2$ pellets, the cleaning efficiency is significantly improved as compared with a more inhomogeneous size distribution. In addition, a cleaning power can be set significantly better, for example, by means of the pressure in the pressurized gas stream. It is advantageous that the gear compressor comprises at least one compressor wheel which is mounted rotatable about a first rotation axis and has a plurality of compressing elements, and at least one intake wheel having a plurality of snow intakes for accepting $CO_2$ snow and configured corresponding to the compressing elements, said intake wheel being mounted rotatable about a second rotation axis and cooperating with the at least one compressor wheel. The intake wheel enables, in particular, $CO_2$ snow to be received in the snow intakes and, by means of the compressing elements cooperating with the snow intakes, to compress it to form $CO_2$ pellets. For example, the compressor wheel and the intake wheel can be configured in the form of gear wheels, the teeth of which engage with one another. The tooth shape can, in particular, be optimized such that the pellets thereby formed have the size and consistency desired for their use. The snow intakes therefore effectively constitute molds into which the $CO_2$ snow is pressed by the compressing elements. In particular, the $CO_2$ snow can be introduced by means of gravity between the cooperating snow intakes and compressing elements and the $CO_2$ pellets generated can fall out of the snow intakes again by means of gravity. In order to facilitate the release of the $CO_2$ pellets out of the snow intakes, both the at least one compressor wheel and also the at least one intake wheel can be provided with an anti-adhesion coating of, for example, polytetrafluoroethylene (PTFE). Favorably, the snow intakes are configured in the form of recesses opening in the radial direction. This arrangement enables introducing $CO_2$ snow into the snow intakes by simple means and compressing it with the compressing elements. Preferably, the recesses are configured corresponding to the compressing elements, specifically such that a compressing element is adapted to the form of a snow intake in order to compress the $CO_2$ snow accepted therein into a $CO_2$ pellet of defined size and consistency. It is further favorable that the intake wheel comprises an intake wheel sleeve with an intake wheel sleeve wall and that the snow intakes are arranged or formed in the intake wheel sleeve wall. With this arrangement, the gear compressor can be implemented to be particularly light, that is with little weight. In addition, with a suitable configuration of the snow intakes, it enables an interior space formed by the intake wheel sleeve to receive produced $CO_2$ pellets. Overall, an apparatus configured as described for producing $CO_2$ pellets from $CO_2$ snow can be formed very compact, since the $CO_2$ pellets can be received in the interior space of the intake wheel sleeve and therefore no additional collecting container is required for the $CO_2$ pellets.

Favorably, the compressing elements are configured in the form of teeth projecting in the radial direction from the compressor wheel. For example, for this purpose, conventional gear wheels can be used for forming the compressor wheel. For example, two or more compressor wheels can be used. In particular, their teeth can be arranged offset to one another in the circumferential direction so that teeth of neighboring gear wheels are arranged at the height of the intertooth spaces.

It is advantageous if the apparatus comprises two or more compressor wheels which are arranged offset in the circumferential direction, so that compressing element intermediate spaces are delimited both in the circumferential direction and also in the axial direction by compressing elements. With this arrangement, in particular, snow intakes that are delimited on all sides can be provided, so that dimensions of the $CO_2$ pellets can be pre-determined in all three spatial directions by the dimensioning of the at least one compressor wheel and/or the at least one intake wheel.

The construction and production of the apparatus are made particularly simple if the at least one compressor wheel and the at least one intake wheel are configured identically or substantially identically. For example, the at least one compressor wheel and the at least one intake wheel can be configured in the form of identical gear wheels, wherein intertooth spaces between teeth of the gear wheels forming compressing elements each form snow intakes. In addition, a particularly compact apparatus can thereby be formed for producing $CO_2$ pellets from $CO_2$ snow.

The structure of the apparatus is further simplified if the first and second rotation axes extend parallel or substantially parallel to one another.

It is further favorable if the plurality of snow intakes are configured in the form of intermediate spaces arranged or formed between the plurality of compressing elements. This enables teeth formed or arranged on one wheel of the gear compressor to be used as compressing elements in cooperation with snow intakes on the other wheel, which are formed between teeth thereof.

According to a further preferred embodiment of the invention, it can be provided that the apparatus comprises an extruding device for extruding $CO_2$ pellets. With the extruding device, $CO_2$ pellets can be produced with a defined cross-sectional area. The extruding device can be formed and/or arranged, in particular, combined with the gear compressor.

Favorably, the extruding device comprises at least one extrusion die with a plurality of through openings. Thus, a plurality of $CO_2$ strands can be simultaneously generated for forming $CO_2$ pellets. Herein, it is advantageous in particular if the at least one extrusion die is arranged rotatable. For example, it can be part of the compressor wheel and/or the intake wheel. Thus, a gear compressor with an extruding device can be formed in a particularly simple and compact manner. The extrusion die can be arranged or formed, in particular, on the compressor wheel and/or the intake wheel so that $CO_2$ pellets can be produced, for example by radial extrusion, particularly from outside inwardly in the direction toward a rotation axis of the compressor wheel or the intake wheel, in that $CO_2$ snow is compressed through suitably formed through openings which are in fluidic communication with the snow intakes. The extrusion die can thus be integrated, in particular, into respectively externally toothed gear wheels forming the compressor wheel and/or the intake wheel. This means, in particular, that the through openings can penetrate the compressing elements, that is for example, the teeth of the gear wheels. Alternatively or additionally, it is also possible that through openings are provided which penetrate the compressor wheel and/or the intake wheel between adjacent compressing elements and open directly into snow intakes. This can be realized, in particular, in that through openings end between teeth on an external side of the compressor wheel or the intake wheel.

It is also advantageous if each of the plurality of through openings defines a longitudinal axis which extends in the radial, or substantially the radial direction away from the first or second rotation axis. In this way, in particular, a cylindrical extrusion die can be formed. With the arrangement of the through openings, it is possible that the compressing elements press $CO_2$ snow into the snow intakes through through openings provided therefor.

Preferably, each snow intake is in fluidic communication with at least one through opening. This is possible, in particular, if the through opening opens into the snow intake or if the through opening penetrates a compressing element which cooperates with a snow intake. If each snow intake is in fluidic communication with exactly one through opening, then by the cooperation of one compressing element and one snow intake, on engagement thereof in one another, exactly one $CO_2$ pellet can be formed. The number of compressing elements distributed over the circumference of the compressor wheel and of snow intakes distributed over the circumference of the intake wheel therefore determines the number of $CO_2$ pellets producible per rotation of the compressor wheel or the intake wheel.

It is advantageous if the compressor wheel comprises a compressor wheel sleeve with a compressor wheel sleeve wall and if the compressing elements are arranged or formed on an external side of the compressor wheel sleeve. In this way, the gear compressor can be formed to be particularly light, that is with little weight. Additionally, an interior space defined by the compressor wheel sleeve can serve to accept the produced $CO_2$ pellets.

For a simple automatic operation of the apparatus, it is favorable if it has a drive device for driving the at least one compressor wheel and/or the at least one intake wheel. By means of the drive device, the at least one compressor wheel and/or the at least one intake wheel can be driven and, optionally also, $CO_2$ snow conveyed between them. The drive can be configured, in particular, as an external synchronous drive which drives both the compressor wheel and the intake wheel, specifically so that the cooperating compressing elements and snow intakes do not touch one another, that is, that as far as possible, a defined gap is formed between them.

For continuous generation of $CO_2$ pellets, it is favorable if the apparatus comprises a reservoir for receiving and storing $CO_2$ snow. The reservoir is preferably arranged or formed upstream of the gear compressor.

It is also advantageous if the apparatus comprises a $CO_2$ connection to connect to a $CO_2$ store containing liquid $CO_2$, or a $CO_2$ store containing liquid $CO_2$. This embodiment enables the apparatus to be used, in particular, in conjunction with a mobile cleaning device.

Furthermore, it is favorable if the apparatus comprises an expansion device in fluidic communication with the $CO_2$ connection or the $CO_2$ store to generate $CO_2$ snow from liquid or gaseous $CO_2$. In this way, $CO_2$ snow can always be generated when the production of $CO_2$ pellets is required.

Favorably, the expansion device comprises an expansion nozzle which is in fluidic communication with the $CO_2$ connection or the $CO_2$ store. Through expansion, liquid or gaseous $CO_2$ can be sufficiently cooled so that $CO_2$ snow is formed.

It is advantageous if the apparatus comprises a scraping device for scraping the formed $CO_2$ pellets off the compressor device. In particular, the scraping device can be arranged or configured such that, for example, $CO_2$ strands formed by the compressor device are separated in order to form $CO_2$ pellets of substantially equal length.

It is also advantageous if the scraping device is configured for scraping the formed $CO_2$ pellets off the at least one compressor wheel and/or off the at least one intake wheel. In particular, the scraping device can be arranged or formed such that $CO_2$ strands extruded by the extruding device are separated in order to form $CO_2$ pellets of substantially equal length.

It is advantageous if the scraping device comprises at least one scraping element which is arranged or formed in a compressor wheel sleeve interior space defined by the compressor wheel sleeve or in an intake wheel sleeve interior space defined by the intake wheel sleeve or at least partly projects into said space. This embodiment enables $CO_2$ pellets extruded through the compressor wheel sleeve or the intake wheel sleeve to be formed with the at least one scraping element by scraping off an extruded $CO_2$ strand. In particular, the at least one scraping element can be arranged or formed to be rotatable, for example, about a longitudinal axis which extends parallel or substantially parallel to a longitudinal axis of the compressor wheel or the intake wheel.

It is advantageous if the at least one scraping element comprises a scraping edge which touches or almost touches a compressor wheel sleeve inner surface of the compressor wheel sleeve delimiting the compressor wheel sleeve interior space or which touches or almost touches an intake wheel sleeve inner surface of the intake wheel sleeve delimiting the intake wheel sleeve interior space. With such a scraping edge, $CO_2$ pellets which, for example, are extruded through a through opening of the compressor wheel sleeve or of the intake wheel sleeve can be scraped off in a simple and reliable manner. Depending on the positioning of the scraping element or the scraping edge thereof, the length of the $CO_2$ pellets to be produced can thus be adjusted.

It is favorable if the compressor device has a pellet outlet which, in particular, is oriented either parallel to the first or second rotation axis or transversely, in particular perpendicularly, to the first or second rotation axis. The first orientation of the pellet outlet is particularly advantageous if the apparatus comprises an extruding device. If the $CO_2$ pellets are formed by the at least one compressor wheel and the at least one intake wheel cooperating therewith, the arrangement or orientation of the pellet outlet transverse to the first or second rotation axis is particularly favorable.

In order to be able as far as possible to use all the pellets produced, it is favorable if the pellet outlet is arranged or formed between the first and second rotation axis. This embodiment is particularly advantageous if the apparatus has no extruding device.

According to a further preferred embodiment of the invention, it can be provided that the pellet outlet is in direct or indirect fluidic communication with a $CO_2$ pellet intermediate store for intermediate storage of the $CO_2$ pellets generated or with a transfer device for transferring the $CO_2$ pellets to a $CO_2$ pellet accelerating device for accelerating the pellets. This configuration or arrangement of the $CO_2$ pellet intermediate store enables sufficient $CO_2$ pellets always to be kept available, both during a discontinuous production process of the $CO_2$ pellets and during a discontinuous spraying process with the $CO_2$ pellets.

It is favorable if the apparatus has a pressure separation device to provide a pressure stage between the expansion device and the pellet outlet. For example, in the region of the pressure separation device, pressures significantly higher than atmospheric pressure can prevail in order to form $CO_2$ snow by expansion of the gas. Preferably, atmospheric pressure prevails at the pellet outlet. Thus, the $CO_2$ pellets can be transferred, for example, without particular difficulties, to an intermediate store or directly into a $CO_2$ pellet accelerating device.

It is advantageous if the pressure separation device comprises at least one gas-tight or substantially gas-tight sealing element and if the at least one sealing element is arranged between the expansion device and the pellet outlet. The sealing element can be configured, in particular, in the form of a plastics seal which is arranged or formed on at least one compressor wheel and/or on at least one intake wheel.

The pressure separation device can be formed particularly easily if the at least one sealing element is formed from $CO_2$ snow, in particular, compressed $CO_2$ snow. In this way, the $CO_2$ snow to be processed to $CO_2$ pellets therefore has a double function. It serves not only as the starting material for forming the $CO_2$ pellets, but also in particular, seals the at least one compressor wheel and the at least one intake wheel relative to one another, so that a pressure separation is formed between the expansion device and the pellet outlet.

Preferably, the at least one sealing element is arranged or formed between the at least one compressor wheel and the at least one intake wheel. Thus, particularly if the at least one sealing element is formed from $CO_2$ snow, the gear compressor can also form the pressure separation device or a part thereof.

The invention also relates to a cleaning device for spraying surfaces to be treated with a mixed stream of a pressurized gas and $CO_2$ pellets, further comprising any one of the apparatuses described above for producing $CO_2$ pellets from $CO_2$ snow.

With a cleaning device of this type it is possible to treat surfaces by spraying with a mixed stream of a pressurized gas, for example, pressurized air and $CO_2$ pellets. The $CO_2$ pellets used therefor can be generated directly in or by means of the cleaning device. This enables minimal use of liquid $CO_2$ or $CO_2$ gas to produce $CO_2$ snow as the starting material for forming the $CO_2$ pellets.

Favorably, the cleaning device comprises a pressurized gas connection for connecting to a pressurized gas generating device, or a pressurized gas generating device. Depending on whether the device is used in a domain where a pressurized gas connection is available or not, in this way pressurized gas can be used or generated in the respectively simplest manner for generating a mixed stream of pressurized gas and $CO_2$ pellets.

Preferably, the cleaning device comprises a transfer device for transferring the $CO_2$ pellets to a $CO_2$ pellet accelerating device for accelerating them. For example, $CO_2$ pellets can be passed from the gear compressor or an intermediate store by means of the transfer device such that they are accelerated before the transfer into a pressurized gas stream or by said pressurized gas stream to form a mixed stream of pressurized gas and $CO_2$ pellets.

In order to obtain the best possible cleaning effect, it is advantageous if the $CO_2$ pellets impact at a high velocity on the surfaces to be treated. For this purpose, it is favorable if the cleaning device comprises a $CO_2$ pellet accelerating device. This can comprise, in particular, a pressurized gas line fluidically communicating with the pressurized gas connection or the pressurized gas generating device. If pressurized gas is fed through the pressurized gas line, $CO_2$ pellets introduced thereinto can be accelerated in a simple and defined manner. A velocity of the $CO_2$ pellets can be adjusted, in particular, by means of a flow velocity of the pressurized gas or the pressure prevailing in the pressurized gas line.

It is advantageous if the transfer device and/or the $CO_2$ pellet accelerating device comprise at least one venturi nozzle. The at least one venturi nozzle generates a negative pressure which can, in particular, draw $CO_2$ pellets into the pressurized gas line if the venturi nozzle is in fluidic communication with the pressurized gas line or forms a part thereof.

According to a further preferred embodiment of the invention, it can be provided that the transfer device comprises a spray connection downstream for connecting to a spray line or that the transfer device is in fluidic communication downstream with a spray line. Thus, for example, a spray line can be connected to the cleaning device in order to direct the mixed stream exactly where it is needed.

Preferably, a jet nozzle is arranged or formed at a free end of the spray line. Thus, the mixed stream can be bundled or focused in a defined manner in order to treat surfaces very precisely, for example, to clean dirt off them.

It is advantageous if the cleaning device comprises a $CO_2$ pellet intermediate store for intermediate storage of the $CO_2$ pellets generated. Thus, the production and output of the $CO_2$ pellets, for example, with the jet nozzle can be entirely separate from one another. In particular, by this means, both discontinuous operation during the production of the $CO_2$ pellets and also discontinuous operation during output of the $CO_2$ pellets through the spray line or the jet nozzle are possible. The $CO_2$ pellet intermediate store therefore serves as a buffer store.

It is favorable if the $CO_2$ pellet intermediate store is directly or indirectly in fluidic communication on one side with the compressor device and on the other side with the transfer device. Thereby, complex transportation of the $CO_2$ pellets can be substantially dispensed with. For example, the $CO_2$ pellet intermediate store can be arranged such that, firstly, the $CO_2$ pellets fall out of the compressor device directly into the $CO_2$ pellet store through an inlet of the $CO_2$ pellet intermediate store and, secondly, are removed through a corresponding outlet and, in particular, can be transferred directly or indirectly to the transfer device.

FIG. 1 shows schematically a cleaning device, identified altogether with the reference sign 10, for spraying surfaces to be treated with a mixed stream 12 of a pressurized gas 14 and $CO_2$ pellets 16.

The cleaning device 10 comprises a housing 18 on which is arranged a $CO_2$ connection 20 which is connected via a $CO_2$ line 22 to a $CO_2$ store 24, for example, in the form of a $CO_2$ pressurized gas cylinder. This can, in particular, contain liquid $CO_2$. Connected downstream of an outlet 26 of the $CO_2$ store is a valve arrangement 28 comprising at least one valve in order to conduct liquid $CO_2$ out of the $CO_2$ store 24 through the $CO_2$ line 22.

The $CO_2$ connection 20 is in fluidic communication via a connecting line 30 to an expansion nozzle 32 of an expansion device 34. The liquid $CO_2$ is expanded by means of the expansion nozzle 32 and forms $CO_2$ snow 36 which is collected in a receiving container 38.

Optionally, the cleaning device 10 can also comprise a separating device 40 in order to separate the $CO_2$ snow 36 produced from non-solidified $CO_2$ gas.

The cleaning device 10 further comprises an apparatus 42 for producing $CO_2$ pellets 16 from $CO_2$ snow 36, having a compressor device 44 for compressing $CO_2$ snow 36 to form $CO_2$ pellets 16. The compressor device 44 is configured in the form of a gear compressor 46.

The $CO_2$ pellets 16 formed are passed to a transfer device 48 which is in fluidic communication via a pressurized gas line 50 with a pressurized gas connection 52. This can be connected to an external pressurized gas source 54 which provides pressurized gas, for example, pressurized air. Optionally, the cleaning device 10 can also comprise a pressurized gas source 56, for example, a pressurized air cylinder or a compressor for generating pressurized air at a desired pressure.

Following the transfer device 48, a mixed stream is formed by the pressurized gas and the $CO_2$ pellets 16 introduced thereto. The $CO_2$ pellets 16 are accelerated with an accelerating device 58 by means of the pressurized gas stream. The accelerating device 58 is in fluidic communication via a line 60 with a spray connection 62 arranged downstream. Optionally, a spray line 64 can be connected or can be permanently connected to the spray connection 62. Optionally arranged at a free end of the spray line 64 is a jet nozzle 66 which can optionally comprise a valve 68 for regulating the form and/or strength of the particle jet 70 emerging from the jet nozzle 66.

The cleaning device 10 can optionally be configured to be mobile and have a chassis 74 comprising at least three wheels 72. Optionally, the cleaning device 10 can have a drive 76 for driving at least one wheel 72.

Furthermore, the cleaning device 10 can have a holding device 78 for receiving one or more $CO_2$ stores 24. Altogether, the cleaning device 10 can be configured so that it can be operated completely independently of external power and $CO_2$ supplies or pressurized gas sources.

Optionally, an intermediate store 80 for $CO_2$ pellets can be formed or arranged between the compressor device 44 and the transfer device 48.

The compressor device 44 also comprises, in particular, a transfer device 82 for transferring $CO_2$ snow 36 from the expansion device 34 or the separating device 40 to the gear compressor 46.

Optionally, the compressor device 44 can comprise an extruding device 84 for extruding the $CO_2$ pellets 16.

The mode of operation of the compressor device 44 will now be described in greater detail making reference to FIG. 2.

The gear compressor 46 comprises a compressor wheel 86 which is arranged rotatable about a first rotation axis 88 and an intake wheel 92 which is arranged rotatable about a second rotation axis 90. The compressor wheel 86 and the intake wheel 92 are configured substantially identically and each comprise a plurality of teeth 94 which form compressing elements 96. Formed between the teeth 94 are snow intakes 98.

The compressor wheel 86 and the intake wheel 92 are arranged such that the first rotation axis 88 and the second rotation axis 90 extend parallel to one another and the teeth 94 engage in the snow intakes 98, preferably without touching them. A drive 100 serves to rotate the compressor wheel 86 and/or the intake wheel 92. The compressor wheel 86 rotates, as indicated schematically in FIG. 2, in the direction of the arrow 102, that is, clockwise and the intake wheel 92 rotates in the direction of the arrow 104, that is, anticlockwise.

The teeth 94 of the compressor wheel 86 and of the intake wheel 92 carry $CO_2$ snow 36 from the receiving container, wherein in each case, a tooth 94 compresses the $CO_2$ snow 36 taken into a snow intake 98 during mutual engagement of the teeth 94 into the snow intakes 98. The compressed $CO_2$ pellets then fall downwardly in the direction of gravity out of the gear compressor 46. The form and size of the $CO_2$ pellets 16 thus formed are substantially identical and depend substantially on how broad the teeth 94 are parallel to the rotation axes 88 and 90.

The $CO_2$ pellets 16 generated fall into the intermediate store 18, which optionally can be omitted. It can be formed in different sizes.

The intermediate store 80 is connected to the accelerating device 58 which comprises a venturi nozzle 108. In the region of the venturi nozzle 108, a cross-section of a pressurized gas line 110 connecting upstream to the venturi nozzle 108 narrows so that in the region of the connection between the intermediate store 80 and the venturi nozzle 108, a negative pressure arises. In this way, the transfer device 82 is defined which draws the $CO_2$ pellets 16 into the pressurized gas line 110. The venturi nozzle 108 also forms part of the accelerating device 58 which accelerates the substantially stationary $CO_2$ pellets 16 from the intermediate store 80 to substantially a velocity of the pressurized gas 14 flowing in the pressurized gas line 110. Downstream of the venturi nozzle 108, the mixed stream 12 of $CO_2$ pellets 16 and pressurized gas 14 then flows through the line 60 to the spray connection 62.

In FIGS. 3 and 4, an alternative embodiment of a gear compressor is identified altogether with the reference sign 46'. Parts of the apparatus 42 which correspond to the arrangement represented schematically in FIG. 2 are identified with identical reference signs.

The gear compressor 46' also comprises a compressor wheel 86' and an intake wheel 92'. These are arranged rotatable about the rotation axes 88' and 90'. The compressor wheel 86' and the intake wheel 92' are not formed solid, but comprise a compressor wheel sleeve 112 or an intake wheel sleeve 114 each of which has teeth 94' facing in the radial direction away from the respective rotation axis 88' or 90'. Formed between the teeth 94' again are snow intakes 98'.

The gear compressor 46' also comprises an extruding device 84'. This comprises two extrusion dies 116 which are formed by a plurality of through openings 118 which penetrate the compressor wheel sleeve 112 and/or the intake wheel sleeve 114. The through openings 118 are configured in the form of bores 120 facing away in the radial direction from the rotation axes 88' or 90'. In the compressor wheel 86' and the intake wheel 92' shown in FIGS. 3 and 4, respectively, a plurality of through openings 118 are formed adjoining one another in the snow intakes 98' or opening into said snow intakes. The counter-rotatably arranged and mutually cooperating compressor wheels 86' and intake wheels 92' receive $CO_2$ snow 36 from the reservoir 38 into the snow intakes 98'. Unlike the gear compressor 46, the $CO_2$ snow 36 is not only compressed with the gear compressor 46' and following the compression, released between the two rotation axes 88 and 90 in the direction of gravity beneath the gear compressor 46, but rather the $CO_2$ snow 36 is compressed through the through openings 118, so that $CO_2$ pellets are formed, specifically by extrusion, particularly inwardly through the intake wheel sleeve 114 into an intake wheel sleeve interior space 132 or through the compressor wheel sleeve 112 into a compressor wheel sleeve interior space 128.

In order to form $CO_2$ pellets 16 of constant length, a scraping device 122 which comprises one or two scraping elements 124, which can each be arranged in the interior of the intake wheel sleeve 114 or the compressor wheel sleeve 112 is optionally provided. The scraping elements 124 comprise a scraping edge 126 which touches or almost touches a compressor wheel sleeve inner surface 130 delimiting the compressor wheel sleeve interior space 128 and/or which touches or almost touches an intake wheel sleeve inner surface 134 delimiting the intake wheel sleeve interior space 132. The $CO_2$ pellets 16 pressed through the through openings 118 are thereby scraped off. The scraping elements 124 are statically arranged on the apparatus 42 and thus do not rotate with the compressor wheel 86' or the intake wheel 92'.

In the case of both the gear compressor 46 and also the gear compressor 46', the compressing elements 96 or 96' and the snow intakes 98 or 98' respectively form cooperating piston-cylinder arrangements in which $CO_2$ snow 36 is formed into $CO_2$ pellets 16.

Preferably, a pressure separation device 106 is provided between the reservoir 38 and the intermediate store 80. It serves to provide a pressure stage between the expansion device 34 and a pellet outlet 138 or 138'. The pressure separation device 106 comprises at least one gas-tight or substantially gas-tight sealing element 140 or 140' which is arranged between the expansion device 34 and the pellet outlet 138 or 138'. Preferably, the at least one sealing element 140 or 140' is formed of $CO_2$ snow 36, in particular, compressed $CO_2$ snow 36. As shown schematically in FIGS. 2 to 4, the at least one sealing element 140 or 140' is arranged or formed between the at least one compressor wheel 86 or 86' and the at least one intake wheel 92 or 92'.

FIG. 5 shows schematically, by way of example, a portion of a compressor wheel arrangement 142 which can be used, for example, as a compressor wheel 86. The compressor wheel arrangement 142 comprises a plurality of gear wheels 144 which are mounted adjoining one another on the same shaft, rotatable about the same rotation axis. Teeth 146 of the gear wheels 144 are arranged so that teeth 146 of adjacent gear wheels are arranged offset in the circumferential direction, specifically by half a tooth pitch angle. This has the result that teeth 146 of adjacent gear wheels are respectively arranged at the height of the snow intakes 148 formed between the teeth 146. Thus, a pellet length can be easily pre-determined, specifically by means of a width 150 of the teeth 146 parallel to the rotation axis of the compressor wheel arrangement 142. By means of this arrangement, compressing element intermediate spaces, that is the snow intakes 148, are delimited by teeth 146 both in the circumferential direction and also in the axial direction.

In a similar way to the compressor wheel arrangement 142, a practically identically configured intake wheel arrangement which cooperates with the compressor wheel arrangement 142 can be provided, similarly to the schematic representation in FIG. 2. Optionally, the compressor wheel arrangement 142 can also be formed with compressor wheels 86' which have through openings 118 so that $CO_2$ pellets 16 can be extruded through the compressor wheel sleeve 112 into a compressor wheel sleeve interior space and optionally scraped off there.

The drive 100 can be an external synchronous drive wherein the compressor wheels 86 or 86' and the intake wheels 92 or 92' are not in contact with their respective teeth 94 or 94'. Preferably, a defined gap is set between the teeth 94 or 94'. Furthermore, the transfer device 82 can be configured in the form of a port for $CO_2$ pellets which only releases $CO_2$ pellets 16 when required.

In FIGS. 6 and 7, a gear wheel is schematically shown designated altogether with the reference sign 152. It comprises an elongate sleeve 156 arranged concentrically to a longitudinal axis 154. One end of the sleeve is closed with an end wall 158 on which a coupling sleeve 160 is formed projecting, also concentrically to the longitudinal axis, from an external side.

A hollow cylindrical sleeve portion 164 extends from an end 162 lying opposite the end wall 158 in the direction toward the end wall 158. Toothing 166 configured in the form of spur toothing 168 with a plurality of elongate teeth 170 adjoins the sleeve portion 164. The teeth 170 extending parallel to the longitudinal axis 154 from an external side 172 of the sleeve 156 in the radial direction relative to the longitudinal axis 154 away therefrom are arranged evenly over the circumference of the sleeve 156.

The teeth 170 are spaced apart in the circumferential direction so that an intertooth space 174 is defined between two teeth 170 in each case. The intertooth space 174 is thus delimited by two teeth 170 and a strip-shaped surface region 176 of the sleeve 156.

The surface region 176 has a plurality of bores which are arranged parallel to the longitudinal axis 154 and the longitudinal axes of which face in the radial direction away from the longitudinal axis 154.

In a transition region between the sleeve portion 164 and the toothing 166, the sleeve portion 164 narrows somewhat so that an outer diameter of the sleeve 156 defined by the external side 172 in the region of the toothing 166 is somewhat smaller than an outer diameter of the sleeve 156 in the region of the sleeve portion 164.

Furthermore, shown schematically in FIGS. 6 and 7 is a scraping device 182. It comprises a bearing sleeve 184 the longitudinal axis 186 of which extends parallel to the longitudinal axis 154. An outer diameter of the bearing sleeve 184 corresponds to approximately a quarter of the outer diameter of the sleeve portion 164.

From an end side of the bearing sleeve 184 which faces in the direction toward an annular end surface 188 defining the end 162, there projects a scraping element 190 which extends into an interior space 192 of the gear wheel 152. The scraping element 190 extends with its free end 194 as far as the end wall 158 and is configured in the form of a cylindrical wall portion which is defined by a part of a hollow cylindrical sleeve and forms an extension of the bearing sleeve 184.

Relative to the longitudinal axis 186, the scraping element 190 extends in the circumferential direction over a circumferential angle of approximately 60°. Scraping surfaces 196 and 198 define planes which contain the longitudinal axis 186. The scraping surfaces 196 and 198 each define a scraping edge 202 or 204 with an outer surface 200 of the scraping element 190.

The scraping device 182 is arranged such that the outer surface 200 touches or almost touches an inner surface 206 of the sleeve 156. Furthermore, the bearing sleeve 184 can be coupled to a drive and rotatably driven about its own longitudinal axis 186. This enables, in particular, both the gear wheel 152 to rotate about its longitudinal axis 154 and also the scraping element 190 to rotate about the longitudinal axis 186. For example, the scraping element 190 can be rotated at a rotary speed which corresponds to a whole number multiple of a rotary speed of the gear wheel 152. For example, the rotary speed can correspond to N-times the rotary speed of the gear wheel 152, where N corresponds to the number of teeth 170. Thus, for each rotation past of a row of bores 178, the scraping element 190 can rotate once about its own axis and scrape off or separate $CO_2$ pellets extruded through the bores 178, so that said pellets all have an substantially uniform and defined length.

The gear wheel 152 can be used, in particular, either as one of the above-described compressor wheels 86 or 86' or as one of the above-described intake wheels 92 or 92'.

Extruded $CO_2$ pellets separated with the scraping element 190 can be carried away through the open end 162 of the sleeve 156 and passed to the intermediate store 80 or the transfer device 82.

FIG. 8 shows schematically a further exemplary embodiment of a gear wheel identified altogether with the reference sign 152'. It corresponds, in its fundamental structure to the gear wheel 152 so that in the following identification of parts of the gear wheel 152', reference signs are used which correspond to the reference signs of the gear wheel 152, with a subsequent prime.

The coupling sleeve 160' has a coupling recess 208' opened in the direction toward the longitudinal axis 154', in which a corresponding coupling projection on a drive shaft, onto which the coupling sleeve 160' can be pushed, can engage. Thus, a positively-engaging connection can be provided between the drive shaft and the coupling sleeve 160 in order to be able to rotate the gear wheel 152', just like the gear wheel 152, in a defined and secure manner about the longitudinal axis 154'.

The gear wheel 152' differs from the gear wheel 152 substantially in that the toothing 166' is configured in the form of helical toothing 210'. The teeth 170' therefore do not extend parallel to the longitudinal axis 154', but obliquely to the longitudinal axis 154' on the external side 172'. In order to enable engagement of the helical toothing 210' and the helical toothing 210' of a second gear wheel 152' in one another, the teeth 170' are twisted such that at each point they protrude from the external side 172 facing away in the radial direction from the longitudinal axis 154. In the intertooth spaces 174' in the respective surface region 176', bores 178' are again arranged adjoining one another.

The gear wheel 152' with a further such gear wheel 152' can replace the compressor wheels 86 or 86' and the intake wheels 92 or 92'. Furthermore, in the gear wheel 152', a scraping device 182 can be provided, as described above in relation to the gear wheel 152.

With the cleaning device 10, in the described manner it is possible to clean surfaces effectively with a mixed stream 12 of pressurized gas 14 and $CO_2$ pellets 16. The $CO_2$ pellets 16 sublime after use and do not have to be separately removed.

REFERENCE SIGNS

10 Cleaning device
12 Mixed stream
14 Pressurised gas
16 $CO_2$ pellet
18 Housing
20 $CO_2$ connection
22 $CO_2$ line
24 $CO_2$ store
26 Outlet
28 Valve arrangement
30 Connecting line
32 Expansion nozzle
34 Expansion device
36 $CO_2$ snow
38 Reservoir
40 Separating device
42 Apparatus
44 Compressor device
46, 46' Gear compressor
48 Transfer device
50 Pressurised gas line
52 Pressurised gas connection
54 Pressurised gas source
56 Pressurised gas source
58 Accelerating device
60 Line
62 Spray connection
64 Spray line
66 Jet nozzle
68 Valve
70 Particle jet
72 Wheel
74 Chassis
76 Drive
78 Holding device
80 Intermediate store
82 Transfer device
84 Extruding device
86, 86' Compressor wheel
88, 88' First rotation axis
90, 90' Second rotation axis
92, 92' Intake wheel
94, 94' Tooth
96, 96' Compressing element
98 Snow intake
100 Drive
102 Arrow
104 Arrow
106 Pressure separation device
108 Venturi nozzle
110 Pressurised gas line
112 Compressor wheel sleeve
114 Intake wheel sleeve
116 Extrusion die
118 Through opening
120 Bore
122 Scraping device
124 Scraping element
126 Scraping edge
128 Compressor wheel sleeve interior space
130 Compressor wheel sleeve inner surface
132 Intake wheel sleeve interior space
134 Intake wheel sleeve inner surface
138 Pellet outlet
140 Sealing element
142 Compressor wheel arrangement
144 Gear wheel
146 Tooth
148 Snow intake
150 Width
152, 152' Gear wheel
154, 154' Longitudinal axis
156, 156' Sleeve
158, 158' End wall
160, 160' Coupling sleeve
162, 162' End
164, 164' Sleeve portion
166, 166' Toothing
168 Spur toothing
170, 170' Tooth
172, 172' External side
174, 174' Intertooth space
176, 176' Surface region
178, 178' Bore
182 Scraping device
184 Bearing sleeve
186 Longitudinal axis
188 End surface
190 Scraping element
192 Interior space 194 Free end
196 Scraping surface
198 Scraping surface
200 Outer surface
202 Scraping edge
204 Scraping edge
206 Inner surface
208' Coupling recess
210' Helical toothing

What is claimed is:

1. An apparatus for producing CO2 pellets from CO2 snow, in particular, for a cleaning device for spraying surfaces to be treated with a mixed stream of a pressurized gas and CO2 pellets, comprising a compressor device for compressing CO2 snow to form CO2 pellets, wherein the compressor device comprises a gear compressor, wherein the gear compressor comprises at least one compressor wheel which is mounted rotatable about a first rotation axis and has a plurality of compressing elements, and comprising at least one intake wheel which has a plurality of snow intakes for accepting CO2 snow, said snow intakes being configured corresponding to the compressing elements, said intake wheel being mounted rotatable about a second rotation axis and cooperating with the at least one compressor wheel, wherein the intake wheel comprises an intake wheel sleeve with an intake wheel sleeve wall, wherein the snow intakes are arranged or formed in the intake wheel sleeve wall, wherein the snow intakes are configured in the form of recesses which are open in the radial direction and wherein an interior space formed by the intake wheel sleeve is configured to receive the CO2 pellets.

2. The apparatus according to claim 1, wherein the compressing elements are configured in the form of teeth projecting in the radial direction from the compressor wheel.

3. The apparatus according to claim 1, further comprising:
two or more compressor wheels which are arranged offset in the circumferential direction, so that compressing element intermediate spaces are delimited both in the circumferential direction and also in the axial direction by compressing elements.

4. The apparatus according to claim 1, wherein the at least one compressor wheel and the at least one intake wheel are configured identically or substantially identically.

5. The apparatus according to claim 1, wherein the first and second rotation axes extend parallel or substantially parallel to one another.

6. The apparatus according to claim 1, wherein the plurality of snow intakes are configured in the form of intermediate spaces arranged or formed between the plurality of compressing elements.

7. The apparatus according to claim 1, further comprising an extruding device for extruding CO2 pellets.

8. The apparatus according to claim 7, wherein the extruding device comprises at least one extrusion die with a plurality of through openings.

9. The apparatus according to claim 8, wherein each of the plurality of through openings defines a longitudinal axis which extends in the radial, or substantially the radial direction away from the first or second rotation axis.

10. The apparatus according to claim 8, wherein each snow intake is in fluidic communication with at least one through opening.

11. The apparatus according to claim 1, wherein the compressor wheel comprises a compressor wheel sleeve with a compressor wheel sleeve wall and wherein the compressing elements are arranged or formed on an external side of the compressor wheel sleeve.

12. The apparatus according to claim 11, wherein the compressor wheel sleeve comprises an interior space for receiving the CO2 pellets.

13. The apparatus according to claim 1, further comprising a drive device for driving at least one of the at least one compressor wheel and the at least one intake wheel.

14. The apparatus according to claim 1, further comprising a reservoir for receiving and storing CO2 snow.

15. The apparatus according to claim 14, wherein the interior space of the intake wheel sleeve forms the reservoir.

16. The apparatus according to claim 1, further comprising a CO2 connection to connect to a CO2 store containing liquid CO2 or by a CO2 store containing liquid CO2.

17. The apparatus according to claim 16 further comprising an expansion device in fluidic communication with the CO2 connection or the CO2 store to generate CO2 snow from liquid or gaseous CO2.

18. The apparatus according to claim 17 wherein the expansion device comprises an expansion nozzle which is in fluidic communication with the CO2 connection or with the CO2 store.

19. The apparatus according to claim 1, further comprising a scraping device for scraping the formed CO2 pellets off the gear compressor.

20. The apparatus according to claim 2, wherein the scraping device is configured for scraping the formed CO2 pellets off at least one of the at least one compressor wheel and off the at least one intake wheel.

21. The apparatus according to claim 20, wherein the scraping device comprises at least one scraping element which is arranged or formed in a compressor wheel sleeve interior space defined by the compressor wheel sleeve or in an intake wheel sleeve interior space defined by the intake wheel sleeve or at least partly projects into said space.

22. The apparatus according to claim 21, wherein the at least one scraping element comprises a scraping edge which touches or almost touches a compressor wheel sleeve inner surface of the compressor wheel sleeve delimiting the compressor wheel sleeve interior space or which touches or almost touches an intake wheel sleeve inner surface of the intake wheel sleeve delimiting the intake wheel sleeve interior space.

23. The apparatus according to claim 2, wherein the compressor device has a pellet outlet which, in particular, is oriented either parallel to the first or second rotation axis or transversely, in particular perpendicularly, to the first or second rotation axis.

24. The apparatus according to claim 23, wherein the pellet outlet is arranged or formed between the first and second rotation axis.

25. The apparatus according to claim 23, wherein the pellet outlet is in direct or indirect fluidic communication with a CO2 pellet intermediate store for intermediate storage of the CO2 pellets generated or with a transfer device for transferring the CO2 pellets to a CO2 pellet accelerating device for accelerating the pellets.

26. The apparatus according to claim 23, further comprising a pressure separation device for providing a pressure stage between the expansion device and the pellet outlet.

27. The apparatus according to claim 26, wherein the pressure separation device comprises at least one gas-tight or substantially gas-tight sealing element and wherein the at least one sealing element is arranged between the expansion device and the pellet outlet.

28. The apparatus according to claim 27, wherein the at least one sealing element is formed of CO2 snow, in particular compressed CO2 snow.

29. The apparatus according to claim 27, wherein the at least one sealing element is arranged or formed between the at least one compressor wheel and the at least one intake wheel.

30. A cleaning device for spraying surfaces to be treated with a mixed stream of a pressurized gas and CO2 pellets, further comprising an apparatus for producing CO2 pellets from CO2 snow according to claim 1.

31. The cleaning device according to claim 30, further comprising a CO2 connection to connect to a CO2 store containing liquid CO2 or by a CO2 store containing liquid CO2.

32. The cleaning device according to claim 30, further comprising a pressurized gas connection for connecting to a pressurized gas generating device, or by a pressurized gas generating device.

33. The cleaning device according to claim 30, further comprising a transfer device for transferring the CO2 pellets to a CO2 pellet accelerating device for accelerating the pellets.

34. The cleaning device according to claim 30, further comprising a CO2 pellet accelerating device which comprises, in particular, a pressurized gas line which is in fluidic communication with the pressurized gas connection or the pressurized gas generating device.

35. The cleaning device according to claim 33, wherein at least one of the transfer device and the CO2 pellet accelerating device comprises at least one venturi nozzle.

36. The cleaning device according to claim 33, wherein the transfer device comprises a spray connection downstream for connecting to a spray line or wherein the transfer device is in fluidic communication downstream with a spray line.

37. The cleaning device according to claim 36, wherein a jet nozzle is arranged or formed at a free end of the spray line.

38. The cleaning device according to claim 30, further comprising a CO2 pellet intermediate store for intermediate storage of the CO2 pellets generated.

39. The cleaning device according to claim 38, wherein the CO2 pellet intermediate store is directly or indirectly in fluidic communication on one side with the compressor device and on the other side with the transfer device.

* * * * *